H. O. LITTLE.
AUTOMATIC FEEDER FOR MILLS.
APPLICATION FILED NOV. 4, 1916.
1,215,826.
Patented Feb. 13, 1917.
2 SHEETS—SHEET 1.
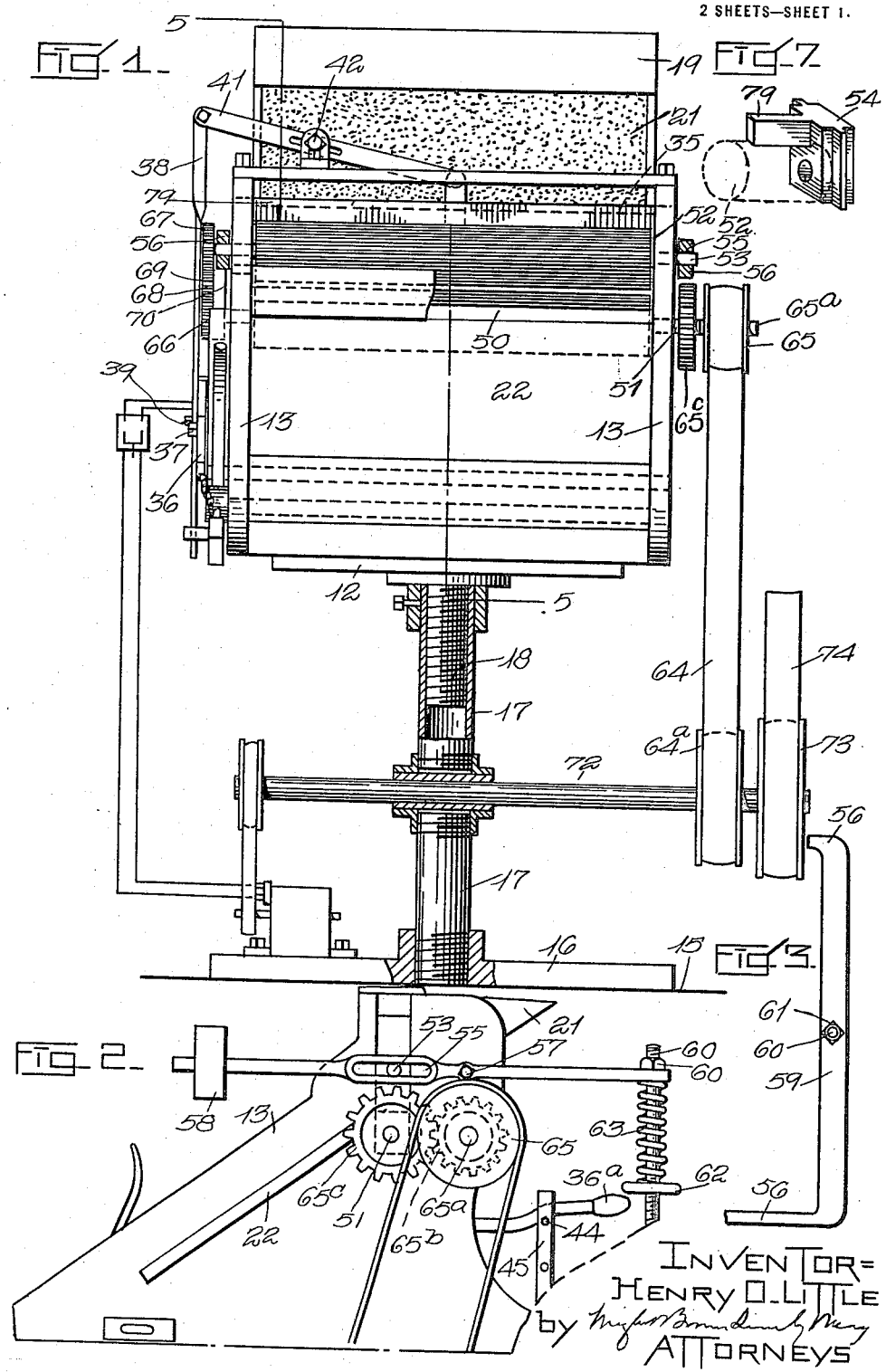

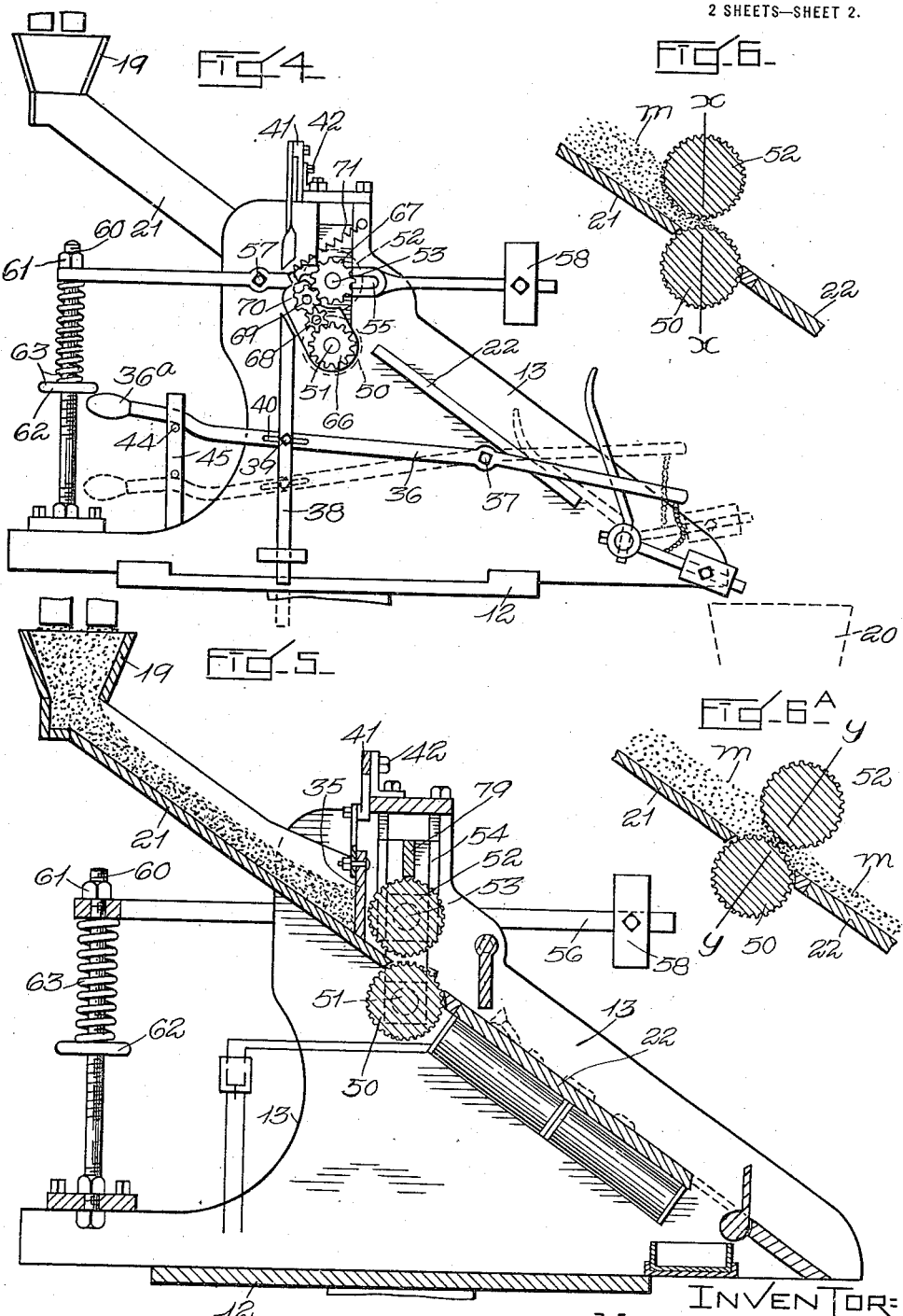

UNITED STATES PATENT OFFICE.

HENRY O. LITTLE, OF BRIDGEWATER, MASSACHUSETTS.

AUTOMATIC FEEDER FOR MILLS.

1,215,826.

Specification of Letters Patent.

Patented Feb. 13, 1917.

Application filed November 4, 1916. Serial No. 129,490.

*To all whom it may concern:*

Be it known that I, HENRY O. LITTLE, a citizen of the United States, residing at Bridgewater, in the county of Plymouth and State of Massachusetts, have invented new and useful Improvements in Automatic Feeders for Mills, of which the following is a specification.

This invention relates particularly to means for conducting grain by gravity to the hopper of a grinding mill. The chief object of the invention is to effect an accurate control of the material flowing by gravity through an inclined chute by rotary feeding means adapted when in motion to aid and regulate the flow, and when at rest to form a barrier preventing the flow, so that, in case the power driving said feeding means and the mill is shut off, the material cannot continue to flow and cause waste of material and the clogging of the mill.

Other objects of the invention are to provide an adjustable regulation of the flow of material, and to prevent injury to the feeding means by bulky foreign bodies passing with the material. To these and other related ends, the invention consists in the improvements which I will now proceed to describe and claim.

Of the accompanying drawings forming a part of this specification,—

Figure 1 represents a front elevation of a grain-conducting chute embodying my invention, parts being broken away and parts shown in section.

Fig. 2 represents a side elevation of a portion of the chute.

Fig. 3 represents a fragmentary plan view showing the cross bar which connects the roll-supporting levers hereinafter described.

Fig. 4 represents a side elevation of the chute looking toward the side opposite that shown by Fig. 2.

Fig. 5 represents a section on the line 5—5 of Fig. 1.

Fig. 6 represents a fragmentary sectional view illustrating the flow-arresting function of the feed rolls, shown by Figs. 1 and 5.

Fig. 6ª represents a fragmentary sectional view showing an arrangement of the feed rolls not in accordance with my invention.

Fig. 7 represents a fragmentary perspective view showing one of the movable bearings of the upper feed roll, and a portion of the dam hereinafter referred to.

The same reference characters indicate the same parts in all of the figures.

The frame supporting the chute and the mechanism hereinafter described coöperating therewith, as here shown, include a base 12 and two spaced-apart uprights 13, the base being supported by a standard secured at its lower end to a floor or other support 15. As here shown, said standard includes a base member 16 rigidly attached to the floor and a tubular upright 17 the upper end of which receives a shank 18 rigidly attached to the base 12.

The upright frame members 13 are spaced apart to receive between them a chute having a bottom which is inclined to permit a gravity flow of grain or like material and extends from a receiving hopper 19 communicating with a source of supply to the hopper 20 of a grinding mill.

The bottom of the chute as here shown includes an upper portion 21 of any suitable material and a lower portion or section 22 of metal adapted to be magnetized and to attract and hold loose metallic bodies such as nails, pieces of wire, etc., passing with a stream of material through the chute.

The magnetizable section 22 and the means illustrated by the drawings but not described herein, for magnetizing and demagnetizing said section and for independently discharging the metallic bodies, form the subject of another application for Letters Patent of the United States filed concurrently herewith.

50 represents a lower horizontal feed roll, the shaft 51 of which is journaled in fixed bearings in the frame members 13, said roll extending across the chute. The upper portion of the roll 50 projects into an opening in the bottom of the chute and above the upper surface of said bottom as shown by Figs. 1 and 6.

52 represents an upper feed roll, the shaft 53 of which is journaled in bearings 54 movable vertically in guides on the frame members 13, the peripheries of said rolls being fluted or corrugated as shown by Fig. 5.

The rolls 50 and 52 are maintained spaced apart by means hereinafter described, and extend across the chute. When the rolls are rotated simultaneously in opposite directions, they aid and regulate the gravity feed of material through the chute.

An important feature of my invention is an arrangement of said rolls relatively to the chute bottom, whereby, when the rolls are at rest, they form a barrier preventing a gravity feed of material between the rolls, so that, in case of the unexpected stoppage of the rolls which is likely to occur particularly when they are driven by electric power, the material cannot flow by gravity between them, but it is immediately arrested. This result is accomplished in the embodiment of the invention here shown by locating the axis of the upper roll in substantially the same vertical plane as the axis of the lower roll as shown by Fig. 6, where the vertical line x—x indicates the plane in which the axes of the rolls stand, this plane being oblique to the plane of the bottom of the chute, so that, when the rolls are at rest, the material above the rolls cannot flow by gravity below the position indicated by Fig. 6, m indicating the material. This result is due to the fact that the rolls are at all times normally so spaced apart that when they are at rest, granular material between them assumes an angle of repose which is tangential to the periphery of the lower roll, and non-tangential to the periphery of the upper roll. The upper roll, therefore, becomes a barrier causing an accumulation of material in the chute at the upper side of the rolls.

It will be seen that, if the axes of the rolls were in a plane perpendicular to the bottom of the chute, as indicated by the line y—y, Fig. 6ª, material would flow by gravity between the rolls when the latter are at rest. The arrangement shown by Fig. 6 therefore prevents waste of material and the clogging of a mill supplied by the chute, in case the rolls are unexpectedly stopped and the flow of grain is not shut off above the rolls.

The upper roll 52 is normally maintained at a predetermined distance from the lower roll by yielding means permitting the upper roll to yield upwardly in case a foreign body of considerable bulk encounters the rolls, damage to the rolls being thus prevented.

As here shown, the ends of the shaft 53 project from the outer sides of the frame members 13 into slots 55 in a pair of two-armed levers 56 fulcrumed at 57. One arm of each lever 56 is provided with a weight 58 which is preferably adjustable, said weights exerting a downward yielding pressure through the levers on the upper roll.

To vary the normal distance between the upper and lower feed rolls, and thus regulate the gravity feed, I provide means preferably embodied in a cross bar 59, Fig. 3, connecting two of the arms of the levers 56, a fixed upright screw-threaded standard 60 passing loosely through said cross bar and having a nut 61 bearing on the upper side of the cross bar, a nut 62 preferably formed as a hand wheel engaged with the threaded portion of the standard 60, and a spring 63 interposed between the nut 62 and the cross bar 59. It will be seen that a vertical adjustment of the nut 62 causes the corresponding adjustment of the upper feed roll through the spring 63. The organization of the upper roll-supporting means is such that the upper roll may be spaced at maximum, minimum and intermediate distances from the lower roll, the spacing being such at all times that when the rolls are at rest granular material between them assumes the above-mentioned angle of repose.

The lower feed roll may be driven by the means shown by Figs. 1 and 2 and including a belt 74 engaged with a driving shaft, not shown, and moving on a pulley 73 on a shaft 72 journaled in a bearing on the standard 18, a belt 64 connecting a pulley 64ª on said shaft with a pulley 65 on a shaft 65ª which is connected by gears 65ᵇ and 65ᶜ with the shaft 51 of the lower roll. Motion is transmitted from the lower roll to the upper roll through a gear 66 attached to the shaft of the lower roll, a gear 67 attached to the shaft of the upper roll, and intermediate gears 68, 69 mounted in a swinging arm 70 which is pivoted to swing on the shaft of the lower roll and is controlled by a spring 71 which holds the gear 69 in engagement with the gear 67. The described connections between the shafts of the two rolls compensate for independent vertical movements of the upper roll.

79 represents a bar attached to and extending between the movable bearings 54 of the upper roll, and located in close proximity to the upper part of the periphery of said roll, said bar constituting a dam adapted to prevent material from flowing over the upper roll not only when the rolls are at rest, but also when the rolls are rotating and the material is fed too rapidly into the upper end of the chute. The material banked up or impounded by the dam and the upper roll acts to hold back the material in the upper portion of the chute and in the hopper 19. The bar or dam 79 therefore constitutes a barrier supplemental to that formed by the upper roll, whereby the height of the accumulation of material may be increased.

35 represents a vertically movable gate located in the chute above the feed rolls whereby the flow of material to the rolls may be arrested if desired. Said gate may be raised and lowered by means of a lever 36 fulcrumed at 37 and having a handle 36ª and a slot 40, a vertical slide 38 having a stud 39 entering said slot, and a two-armed lever 41 fulcrumed at 42, one arm of said lever being connected with the slide 38 and the other arm with the gate, as shown by Fig. 1. The lever 36 may be confined to hold the gate closed by a pin 44 inserted in an upper orifice in a fixed standard 45. Said pin, when inserted in a lower orifice in said standard, holds the gate open.

The inclined chute and its adjuncts hereinbefore described may constitute a part of the structure of a grinding mill instead of being constructed independently thereof as here shown.

I claim:—

1. In combination, a chute having an inclined bottom permitting a gravity feed, a horizontal lower feed roll, the upper portion of which projects above said bottom, a horizontal upper feed roll spaced from the lower roll, said rolls extending across the chute and their axes being arranged in a substantially vertical plane, said arrangement and the spacing of the rolls being such that when the rolls are at rest granular material interposed between them assumes an angle of repose tangential to the periphery of the lower roll, the upper roll becoming a barrier, causing an accumulation of material at the upper side of the rolls, and means for rotating said rolls to aid and regulate the gravity feed.

2. In combination, a chute having an inclined bottom permitting a gravity feed, a horizontal lower feed roll journaled in fixed bearings and projecting above said bottom, a horizontal upper feed roll journaled in vertically movable bearings, said rolls extending across the chute and their axes being arranged in a substantially vertical plane, and adjustable upper roll-supporting means, having provisions for maintaining the upper roll spaced at maximum, minimum and intermediate distances from the lower roll, the spacing being such at all times that when the rolls are at rest granular material interposed between them assumes an angle of repose tangential to the periphery of the lower roll, the upper roll becoming a barrier causing an accumulation of material in the chute at the upper side of the rolls, and means for driving the rolls to aid the gravity feed, said feed being regulable by varying the spacing of the rolls, and said driving means being organized to compensate for vertical movements of the upper roll.

3. In combination, a chute having an inclined bottom permitting a gravity feed, a horizontal lower feed roll journaled in fixed bearings, and arranged with the upper portion of its periphery projecting above the chute bottom, a horizontal upper feed roll spaced from the lower roll and journaled in vertically movable bearings, said rolls extending across the chute and their axes being arranged in a substantially vertical plane, said arrangement and the normal spacing of the rolls being such that the rolls when at rest form a barrier preventing a gravity feed, a pair of two-armed levers having slotted weighted arms engaged with the shaft of the upper roll, means for exerting upward yielding pressure on the other arms of said levers to yieldingly support said upper roll at a predetermined distance from the lower roll, the upper roll being displaceable upwardly by foreign bodies in a stream of material passing between the rolls and adapted to return automatically to its normal position, means for driving the lower roll, and driving connections between the upper and lower rolls organized to compensate for vertical movements of the upper roll.

4. In combination, a chute having an inclined bottom permitting a gravity feed, a horizontal lower feed roll journaled in fixed bearings, and arranged with the upper portion of its periphery projecting above the chute bottom, a horizontal upper feed roll spaced from the lower roll and journaled in vertically movable bearings, said rolls extending across the chute and their axes being arranged in a substantially vertical plane, said arrangement and the normal spacing of the rolls being such that the rolls when at rest, form a barrier preventing a gravity feed, a pair of two-armed levers having slotted weighted arms engaged with the shaft of the upper roll, adjustable means for exerting upward yielding pressure on the other arms of said levers to yieldingly support the upper roll normally at various predetermined distances from the lower roll, the upper roll being displaceable upwardly by foreign bodies passing between the rolls and adapted to return automatically to its normal position, means for driving the lower roll, and driving connections between the lower and upper rolls, organized to compensate for vertical movements of the upper roll.

5. In combination, an inclined chute, permitting a gravity feed, a pair of horizontal spaced-apart feed rolls extending across the chute and having their axes parallel and in a vertical plane and adapted to aid and regulate the gravity feed, means for rotating said rolls, a movable gate adapted to close upon the bottom of the chute and obstruct the chute above said rolls, and means for opening and closing said gate.

In testimony whereof I have affixed my signature.

HENRY O. LITTLE.